(12) United States Patent
Xue et al.

(10) Patent No.: US 11,386,346 B2
(45) Date of Patent: Jul. 12, 2022

(54) SYSTEMS AND METHODS FOR QUANTUM BAYESIAN NETWORKS

(71) Applicant: D-WAVE SYSTEMS INC., Burnaby (CA)

(72) Inventors: Yanbo Xue, Toronto (CA); William G. Macready, West Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 411 days.

(21) Appl. No.: 16/357,773

(22) Filed: Mar. 19, 2019

(65) Prior Publication Data

US 2020/0019879 A1    Jan. 16, 2020

Related U.S. Application Data

(60) Provisional application No. 62/696,302, filed on Jul. 10, 2018.

(51) Int. Cl.
*G06N 10/00* (2019.01)
*B82Y 10/00* (2011.01)
(Continued)

(52) U.S. Cl.
CPC .............. *G06N 10/00* (2019.01); *B82Y 10/00* (2013.01); *G06N 7/005* (2013.01); *G06N 20/00* (2019.01)

(58) Field of Classification Search
CPC ............ G06N 20/00; G06N 3/08; G06N 5/04; G06N 3/0427; G06N 3/0445; G06N 3/084; G06N 3/088; G06N 5/003; G06N 3/02; G06N 3/0472; G06N 3/0481; G06N 3/0436; G06N 5/046; G06N 7/005; G06N 3/04; G06N 5/022; G06N 3/0418; G06N 3/0454; G06N 3/006; G06N 20/10; G06N 3/126;
(Continued)

(56) References Cited

U.S. PATENT DOCUMENTS 3,470,828 A    10/1969  Powell et al.
6,671,661 B1   12/2003  Bishop
(Continued)

FOREIGN PATENT DOCUMENTS

CA    2984773 A1    12/2016
CN    101473346 A    7/2009
(Continued)

OTHER PUBLICATIONS

Freidman, et al., "Learning Bayesian Networks from Data", Internet Movie Database, http://www.imdb.com, 19 pages.
(Continued)

*Primary Examiner* — Robert G Bachner
(74) *Attorney, Agent, or Firm* — Cozen O'Connor (57) ABSTRACT

Techniques are provided for computing problems represented as directed graphical models via quantum processors with topologies and coupling physics which correspond to undirected graphs. These include techniques for generating approximations of Bayesian networks via a quantum processor capable of computing problems based on a Markov network-based representation of such problems. Approximations may be generated by moralization of Bayesian networks to Markov networks, learning of Bayesian networks' probability distributions by Markov networks' probability distributions, or otherwise, and are trained by executing the resulting Markov network on the quantum processor.

21 Claims, 3 Drawing Sheets

(51) Int. Cl.
*G06N 20/00* (2019.01)
*G06N 7/00* (2006.01)

(58) Field of Classification Search
CPC ........ G06N 20/20; G06N 3/082; G06N 3/049;
G06N 3/063; G06N 3/086; G06N 5/02;
G06N 7/02; G06N 3/002; G06N 3/004;
G06N 5/045; G06N 5/048; G06N 7/00;
H04L 2209/38; H04L 9/3239; H04L
2209/56; H04L 9/0637; H04L 67/12;
H04L 9/0643; H04L 47/783; H04L
47/788; H04L 47/823; H04L 67/10; H04L
1/0009; H04L 1/0041; H04L 1/18; H04L
5/0064; H04L 63/123; H04L 67/1097;
H04L 67/2809; H04L 67/2833; H04L
67/40; H04L 9/3263; H04L 1/0076; H04L
1/16; H04L 1/1854; H04L 1/1867; H04L
1/1874; H04L 25/0202; H04L 27/0014;
H04L 51/02; H04L 51/043; H04L 51/046;
H04L 5/0008; H04L 63/04; H04L 63/102;
H04L 63/12; H04L 63/126; H04L
63/1425; H04L 63/20; H04L 67/22; H04L
67/26; H04L 67/306; H04L 9/3213; H04L
9/3247; H04L 9/3297; G06Q 30/0201;
G06Q 20/405; G06Q 50/01; G06Q
2220/18; G06Q 30/0206; G06Q 40/04;
G06Q 10/10; G06Q 10/0639; G06Q
40/025; G06Q 30/018; G06Q 30/0278;
G06Q 40/08; G06Q 50/18; G06Q 50/26;
G06Q 30/0208; G06Q 30/0215; G06Q
50/188; G06Q 30/06; G06Q 10/04; G06Q
30/0202; G06Q 10/067; G06Q 20/38215;
G06Q 20/4016; G06Q 2220/00; G06Q
50/06; G06Q 10/06314; G06Q 10/06315;
G06Q 20/06; G06Q 20/065; G06Q
20/0655; G06Q 20/0855; G06Q 20/12;
G06Q 20/123; G06Q 20/145; G06Q
20/29; G06Q 20/308; G06Q 20/367;
G06Q 20/384; G06Q 20/389; G06Q
20/401; G06Q 2220/12; G06Q 30/0205;
G06Q 30/0247; G06Q 30/0254; G06Q
30/0273; G06Q 30/0276; G06Q 40/10;
G06Q 50/184; G06Q 10/0635; G06Q
10/0637; G06Q 10/0834; G06Q 10/087;
G06Q 30/02; G06Q 30/0635; G06Q
10/06313; G06Q 10/0633; G06Q 10/08;
G06Q 10/0838; G06Q 30/0207; G06Q
30/0643; G06Q 50/28; G06Q 10/02;
G06Q 10/06; G06Q 10/101; G06Q
10/1053; G06Q 20/02; G06Q 20/047;
G06Q 20/3672; G06Q 30/0241; G06Q
30/0282; G06Q 30/0631; G06Q 30/08;
G06Q 40/00

See application file for complete search history.

(56) References Cited

U.S. PATENT DOCUMENTS

| | | |
|---|---|---|
| 7,135,701 B2 | 11/2006 | Amin et al. |
| 7,418,283 B2 | 8/2008 | Amin |
| 7,493,252 B1 | 2/2009 | Nagano et al. |
| 7,533,068 B2 | 5/2009 | Maassen et al. |
| 7,876,248 B2 | 1/2011 | Berkley et al. |
| 8,008,942 B2 | 8/2011 | Van et al. |
| 8,035,540 B2 | 10/2011 | Berkley et al. |
| 8,073,808 B2 | 12/2011 | Rose |
| 8,190,548 B2 | 5/2012 | Choi |
| 8,195,596 B2 | 6/2012 | Rose et al. |
| 8,244,650 B2 | 8/2012 | Rose |
| 8,340,439 B2 | 12/2012 | Mitarai et al. |
| 8,421,053 B2 | 4/2013 | Bunyk et al. |
| 8,863,044 B1 | 10/2014 | Casati et al. |
| 9,378,733 B1 | 6/2016 | Vanhoucke et al. |
| D795,416 S | 8/2017 | Blomberg et al. |
| 9,727,824 B2 | 8/2017 | Rose et al. |
| 10,296,846 B2 | 5/2019 | Csurka et al. |
| 10,339,466 B1 | 7/2019 | Ding et al. |
| 10,817,796 B2 | 10/2020 | Macready et al. |
| 2002/0010691 A1 | 1/2002 | Chen |
| 2003/0030575 A1 | 2/2003 | Frachtenberg et al. |
| 2005/0119829 A1 | 6/2005 | Bishop et al. |
| 2006/0041421 A1 | 2/2006 | Ta et al. |
| 2006/0047477 A1 | 3/2006 | Bachrach |
| 2006/0074870 A1 | 4/2006 | Brill et al. |
| 2006/0115145 A1 | 6/2006 | Bishop et al. |
| 2007/0011629 A1 | 1/2007 | Shacham et al. |
| 2007/0162406 A1 | 7/2007 | Lanckriet |
| 2008/0069438 A1 | 3/2008 | Winn et al. |
| 2008/0103996 A1 | 5/2008 | Forman et al. |
| 2008/0132281 A1 | 6/2008 | Kim et al. |
| 2008/0176750 A1 | 7/2008 | Rose et al. |
| 2008/0215850 A1 | 9/2008 | Berkley et al. |
| 2008/0313430 A1 | 12/2008 | Bunyk |
| 2009/0077001 A1 | 3/2009 | Macready et al. |
| 2009/0121215 A1 | 5/2009 | Choi |
| 2009/0171956 A1 | 7/2009 | Gupta et al. |
| 2009/0254505 A1 | 10/2009 | Davis et al. |
| 2009/0278981 A1 | 11/2009 | Bruna et al. |
| 2009/0322871 A1 | 12/2009 | Ji et al. |
| 2010/0010657 A1 | 1/2010 | Do et al. |
| 2010/0185422 A1 | 7/2010 | Hoversten |
| 2010/0228694 A1 | 9/2010 | Le et al. |
| 2010/0332423 A1 | 12/2010 | Kapoor et al. |
| 2011/0022369 A1 | 1/2011 | Carroll et al. |
| 2011/0022820 A1 | 1/2011 | Bunyk et al. |
| 2011/0044524 A1 | 2/2011 | Wang et al. |
| 2011/0047201 A1 | 2/2011 | Macready et al. |
| 2011/0142335 A1 | 6/2011 | Ghanem et al. |
| 2011/0231462 A1 | 9/2011 | Macready et al. |
| 2011/0238378 A1 | 9/2011 | Allen et al. |
| 2011/0295845 A1 | 12/2011 | Gao et al. |
| 2012/0084235 A1 | 4/2012 | Suzuki et al. |
| 2012/0124432 A1 | 5/2012 | Pesetski et al. |
| 2012/0149581 A1 | 6/2012 | Fang |
| 2012/0215821 A1 | 8/2012 | Macready et al. |
| 2012/0254586 A1 | 10/2012 | Amin et al. |
| 2013/0097103 A1 | 4/2013 | Chari et al. |
| 2013/0236090 A1 | 9/2013 | Porikli et al. |
| 2013/0245429 A1 | 9/2013 | Zhang et al. |
| 2014/0025606 A1 | 1/2014 | Macready |
| 2014/0040176 A1 | 2/2014 | Balakrishnan et al. |
| 2014/0152849 A1 | 6/2014 | Bala et al. |
| 2014/0187427 A1 | 7/2014 | Macready et al. |
| 2014/0201208 A1 | 7/2014 | Satish et al. |
| 2014/0214835 A1 | 7/2014 | Oehrle et al. |
| 2014/0214836 A1 | 7/2014 | Stivoric et al. |
| 2014/0297235 A1 | 10/2014 | Arora et al. |
| 2015/0006443 A1 | 1/2015 | Rose et al. |
| 2015/0161524 A1 | 6/2015 | Hamze |
| 2015/0242463 A1 | 8/2015 | Lin et al. |
| 2015/0248586 A1 | 9/2015 | Gaidon et al. |
| 2015/0269124 A1 | 9/2015 | Hamze et al. |
| 2015/0317558 A1 | 11/2015 | Adachi et al. |
| 2016/0019459 A1 | 1/2016 | Audhkhasi et al. |
| 2016/0042294 A1 | 2/2016 | Macready et al. |
| 2016/0078600 A1 | 3/2016 | Perez Pellitero et al. |
| 2016/0110657 A1 | 4/2016 | Gibiansky et al. |
| 2016/0191627 A1 | 6/2016 | Huang et al. |
| 2016/0307305 A1 | 10/2016 | Madabhushi et al. |
| 2017/0132509 A1 | 5/2017 | Li et al. |
| 2017/0255871 A1 | 9/2017 | Macready et al. |
| 2017/0300817 A1 | 10/2017 | King et al. |
| 2017/0357274 A1 | 12/2017 | Baughman et al. |
| 2018/0018584 A1 | 1/2018 | Nock et al. |

(56) References Cited

U.S. PATENT DOCUMENTS

| | | | |
|---|---|---|---|
| 2018/0025291 | A1 | 1/2018 | Dey et al. |
| 2018/0065749 | A1 | 3/2018 | Cantrell et al. |
| 2018/0137422 | A1 | 5/2018 | Wiebe et al. |
| 2018/0157923 | A1 | 6/2018 | El Kaliouby et al. |
| 2018/0165554 | A1 | 6/2018 | Zhang et al. |
| 2018/0165601 | A1 | 6/2018 | Wiebe et al. |
| 2019/0005402 | A1 | 1/2019 | Mohseni et al. |
| 2019/0018933 | A1 | 1/2019 | Oono et al. |
| 2019/0180147 | A1 | 6/2019 | Zhang et al. |

FOREIGN PATENT DOCUMENTS

| | | | |
|---|---|---|---|
| CN | 101657827 | A | 2/2010 |
| CN | 102324047 | A | 1/2012 |
| CN | 102364497 | A | 2/2012 |
| CN | 102651073 | A | 8/2012 |
| CN | 102831402 | A | 12/2012 |
| CN | 102324047 | B | 6/2013 |
| CN | 102364497 | B | 6/2013 |
| CN | 104050509 | A | 9/2014 |
| CN | 102037475 | B | 5/2015 |
| CN | 104766167 | A | 7/2015 |
| CN | 104919476 | A | 9/2015 |
| CN | 106569601 | A | 4/2017 |
| JP | 2011008631 | A | 1/2011 |
| KR | 20130010181 | A | 1/2013 |
| WO | 2009120638 | A2 | 10/2009 |
| WO | 2010071997 | A1 | 7/2010 |
| WO | 2015193531 | A1 | 12/2015 |
| WO | 2016029172 | A1 | 2/2016 |
| WO | 2016089711 | A1 | 6/2016 |
| WO | 2016210018 | A1 | 12/2016 |
| WO | 2017031356 | A1 | 2/2017 |
| WO | 2017031357 | A1 | 2/2017 |
| WO | 2017124299 | A1 | 7/2017 |
| WO | 2017132545 | A1 | 8/2017 |

OTHER PUBLICATIONS

Sakkaris, et al., "QuDot Nets: Quantum Computers and Bayesian Networks", arXiv:1607.07887v1 [quant-ph] Jul. 26, 2016, 22 pages.
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Hinton, Geoffrey, "A Practical Guide to Training Restricted Boltzmann Machines", Version 1, Department of Computer Science University of Toronto, Aug. 2, 2010, 21 pages.
Husmeier, "Introduction to Learning Bayesian Networks from Data", Probabilistic Modeling in Bioinformatics and Medical Informatics 2005. https://link.springer.com/chapter/10.1007/1-84628-119-9_2, 41 pages.
Korenkevych, et al., "Benchmarking quantum hardware for training of fully visible boltzmann machines", arXiv:1611.04528 Nov. 14, 2016. https://arxiv.org/abs/1611.04528, 22 pages.
Murphy, "A Brief Introduction to Graphical Models and Bayesian Networks", Oct. 14, 2001. https://www.cs.ubc.ca/~murphyk/Bayes/bayes_tutorial.pdf, 19 pages.
Murphy, "Machine Learning: a probalistic perspective", MIT Press, 2012. http://noiselab.ucsd.edu/ECE228/Murphy_Machine_Learning.pdf.
Xing, "Bayesian and Markov Networks: A unified view", Carnegie Mellon: School of Computer Science, Sep. 19, 2007. http://www.cs.cmu.edu/~epxing/Class/10708-07/Slides/lecture3-BN&MRF.pdf.
"An implementation of the high-throughput computing system using the GPU (005)", No. English translations, 2019-516164, IEICE Technical Report, vol. 114 No. 302, Nov. 13-14, 2014, 12 pages.
"Cluster Analysis", UIUC, 2013.
"Neuro-computing for Parallel and Learning Information Systems", 2019-516164, www.jstage.jst.go.jp/article/sicej/1962/27/3/27_3_255/_article/-char/ja, Nov. 14, 2021, 17 pages.

Amin, "Effect of Local Minima on Adiabatic Quantum Optimization," Physical Review Letters 100(130503), 2008, 4 pages.
Bach, F et al., "Optimization with Sparsity-Inducing Penalties," arXiv:1108.0775v2 [cs.LG], Nov. 22, 2011, 116 pages.
Berkley, A.J. et al., "Tunneling Spectroscopy Using a Probe Qubit," arXiv:1210.6310v2 [cond-mat.supr-con], Jan. 3, 2013, 5 pages.
Brakel, P., Dieleman, S., & Schrauwen. "Training restricted Boltzmann machines with multi-tempering: Harnessing parallelization", 2012.
Courville, A. et al., "A Spike and Slab Restricted Boltzmann Machine," Proceedings of the 14th International Conference on Artificial Intelligence and Statistics (AISTATS), 2011, 9 pages.
Deng, J et al., "ImageNet: A Large-Scale Hierarchical Image Database," Proceedings / CVPR, IEEE Computer Society Conference on Computer Vision and Pattern Recognition, 2009, 8 pages.
Desjardins, G., Courville, A., Bengio, Y., Vincent, P., & Delalleau, O. "Parallel tempering for training of restricted Boltzmann machines", 2010.
Dumoulin, Vincent, et al. "On the Challenges of Physical implementations of RBMs". arXiv:1312.5258v1, Dec. 13, 2013.
Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.
Fergus, R. et al., "Semi-Supervised Learning in Gigantic Image Collections," Advances in Neural Information Processing Systems, vol. 22, 2009, 8 pages.
Freund, Y. et al., "Large Margin Classification Using the Perceptron Algorithm," Machine Learning 37(3), 1999, 19 pages.
Fung, G. et al., "Parameter Free Bursty Events Detection in Text Streams," Proceedings of the 31st VLDB Conference, Trondheim, Norway, 2005, 12 pages.
Gómez-Bombarelli et al., "Automatic Chemical Design Using a Data-Driven Continuous Representation of Molecules," arXiv:1610.02415v3: Dec. 2017. (26 pages).
Goodfellow et al., "Generative Adversarial Nets", arXiv:1406.2661 v1 [stat.ML], 9 pages, Jun. 10, 2014.
Hinton et al., "A Practical Guide to Training Restricted Boltzmann Machines," Springer, pp. 599-619, Jan. 1, 2012.
Hjelm, "Boundary-Seeking Generative Adversarial Networks", arXiv:1702.08431v4 [stat.ML], 17 pages, Feb. 21, 2018.
Jenatton, R. et al., "Proximal Methods for Hierarchical Sparse Coding," arXiv:1009.2139v4 [stat.ML], Jul. 5, 2011, 38 pages.
Khalek, S. et al., "Automated SQL Query Generation for Systematic Testing of Database Engines," ASE '10 Proceedings of the IEEE/ACM international conference on Automated software engineering, 2010, 4 pages.
Krahenbuhl, P. et al., "Efficient Inference in Fully Connected CRFs with Gaussian Edge Potentials," arXiv: 1210.5644 [cs.CV], 2012, 9 pages.
Kuželka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001, 10 pages.
Minh, V. et al., "Learning to Label Aerial Images from Noisy Data," Proceedings of the 29th International Conference on Machine Learning, Edinburgh, Scotland, 2012, 8 pages.
Mirza et al., "Conditional Generative Adversarial Nets", arXiv:1411.1784v1 [cs.LG], 7 pages, Nov. 6, 2014.
Miyata et al., "Consideration of 2D-FFT by Decomposition-of-Large Scale Data on Multi-GPU", IEICE Technical Report, vol. 114 No. 155, Computer Systems Jul. 28-30, 2014, Abstract, 12 pages.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04 Proceedings of the 20th conference on Uncertainty in Artificial Intelligence, 2004, 8 pages.
Natarajan, N. et al., "Learning with Noisy Labels," Advances in Neural Information Processing Systems 26, 2013, 9 pages.

(56) References Cited

OTHER PUBLICATIONS

Neven, H. et al., "QBoost: Large Scale Classifier Training with Adiabatic Quantum Optimization," JMLR: Workshop and Conference Proceedings 25, 2012, 16 pages.
Niv, "Reinforcement Learning in the Brain". Journal of Mathematical Psychology, 2009—Elsevier.
Prakash, "Quantum Algorithms for Linear Algebra and Machine Learning," Doctoral Thesis, Technical Report No. UCB/EECS-2014-211, University of California at Berkeley, 2014, pp. 1-9.
Quattoni, A. et al., "Hidden Conditional Random Fields," IEEE Transactions on Pattern Analysis and Machine Intelligence, 29(10), 2007, 6 pages.
Rezende et al., "Stochastic Backpropagation and Approximate Inference in Deep Generative Models," arXiv:1401.4082v3 [stat.ML] May 30, 2014, 14 pages.
Ross, S. et al., "Learning Message-Passing Inference Machines for Structured Prediction," CVPR 2011, 2011, 8 pages.
Scarselli, F. et al., "The Graph Neural Network Model," IEEE Transactions on Neural Networks, vol. 20, No. 1, 2009, 22 pages.
Sukhbaatar et al., "Training Convolutional Networks with Noisy Labels," arXiv:1406.2080v4 [cs.CV] Apr. 10, 2015, 11 pages.
Tieleman, T., "Training Restricted Boltzmann Machines using Approximation to the Likelihood Gradient," ICML '08 Proceedings of the 25th international conference on Machine learning, 2008, 8 pages.
Van de Meent, J-W., Paige, B., & Wood, "Tempering by subsampling", 2014.
Van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, Physical Review B 94, 195105 (2016), 5 pages.
Wang, W., Machta, J., & Katzgraber, H. G. "Population annealing: Theory and applications in spin glasses", 2015.
Williams, "Simple Statistical Gradient-Following Algorithms for Connectionist Reinforcement Learning," College of Computer Science, Northeastern University, Boston, MA, 1992, 27 pages.
Yoshihara et al., "Estimating the Trend of Economic Indicators by Deep Learning", 2019-516164, Graduate School of System Informatics, Kobe University, 28 Annual Conferences of Japanese Society for Artificial Intelligence 2014, 10 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv: 1702.08658 Feb. 28, 2017. https://arxiv.org/abs/1702.08658.
Zhu, X. et al., "Combining Active Learning and Semi-Supervised Learning Using Gaussian Fields and Harmonic Functions," ICML 2003 workshop on The Continuum from Labeled to Unlabeled Data in Machine Learning and Data Mining, 2003, 8 pages.
Zojaji et al., "A Survey of Credit Card Fraud Detection Techniques: Data and Technique Oriented Perspective", arXiv:1611.06439 Nov. 19, 2016. https://arxiv.org/abs/1611.06439.
Amin, et al., "Quatum Boltzmann Machine". arXiv:1601.02036v1, Jan. 8, 2016.
Anonymous, "A Robust Learning Approach to Domain Adaptive Object Detection". CVPR, 2019.
Azadi, et al., "Auxiliary Image Regulation for Deep CNNs with Noisy Labels". arXiv:1511.07069v2 (2016).
B. Sallans and G.E. Hitton , "Reinforcement Learning with Factored States and Actions". JMLR, 5:1063-1088, 2004.
Bach, et al., "Optimization with Sparsity-Inducing Penalties". arXiv:1108.0775v2, Nov. 22, 2011.
Bahnsen, et al., "Feature Engineering Strategies for Credit Card Fraud Detection", Expert systems with applications Elsevier Jun. 1, 2016. https://www.sciencedirect.com/science/article/abs/pii/S09574174150083867via%3Dihub.
Barron-Romero, Carlos, "Classical and Quantum Algorithms for the Boolean Satisfiability Problem", CoRR, Abs/1510.02682)Year:2015).

Bearman, et al., "What's the Point: Semantic Segmentation with Point Supervision". ECCV, Jul. 23, 2016. https://arxiv.org/abs/1506.02106.
Bell, et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya, et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian, et al., "The Ising Model: teaching an old problem new tricks", D-wave systems. 2 (year 2010), 32 pages.
Bielza, et al., "Bayesian networks in neuroscience: a survey", Oct. 1, 20146, Frontiers in Computational Neuroscience, vol. 8, Article 131, p. 1-23 (Year: 2014).
Bolton, et al., "Statistical fraud detection: A review", Statistical Science 17(3) Aug. 1, 2002. https://projecteuclid.org/journals/statistical-science/vol. 17/issue-3/Statistical-Fraud-Detection-A-Review/10.1214/ss/1042727940.full.
Burda, et al., "Importance Weighted Autoencoders", arXiv: 1509.00519 Nov. 7, 2016. https://arxiv.org/abs/1509.00519.
Buss, "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.
Chen, et al., "Domain Adaptive Faster R-CNN for Object Detection in the Wild". IEEE Xplore, 2018. https://arxiv.org/abs/1803.03243.
Chen, et al., "Stochastic Gradient Hamiltonian Monte Carlo", arXiv: 1402.4102 May 12, 2014. https://arxiv.org/abs/1402.4102.
Cho, Kyunghyun, et al., "On the Properties of Neural Machine Translation: Encoder-Decoder Approaches", arXiv:1409.1259v2, [cs.CL] Oct. 7, 2014, 9 pages.
Cho, K-H., Raiko, T, & Ilin, A., "Parallel tempering is efficient for learning restricted Boltzmann machines", 2010.
Courbariaux, M., et al., "Binarized Neural Networks: Training Neural Networks with Weights and Activations Constrained to +1 or −1". http://arxiv.org/pdf/1602.02830.pdf.
Dai, et al., "Generative Modeling of Convolutional Neural Networks". ICLR 2015.
Doersch, "Tutorial on variational autoencoders", arXiv: 1606.05908 Jan. 3, 2021. https://arxiv.org/abs/1606.05908.
Dumoulin, Vincent, et al., "On the Challenges of Physical Implementations of RBMs", https://arxiv.org/abs/1312.5258v2, Oct. 24, 2014.
Fabius, Otto, et al., "Variational Recurrent Auto-Encoders", Accepted as workshop contributions at ICLR 2015, 5 pages.
Fischer, A. & Igel, C., "A bound for the convergence rate of parallel tempering for sampling restricted Boltzmann machines", 2015.
Friedman, et al., "Learning Bayesan Networks from Data", Stanford Robotics, http://robotics.stanford.edu/people/nir/tutorial/index.html.
G. Hinton, N. Srivastava, et al., "Improving neural networks by preventing co-adaptation of feature detectors". CoRR , abs/1207.0580, 2012.
G.A. Rummery and M. Niranjan , "Online Q-Learning using Connectionist Systems". CUED/FINFENG/TR 166, Cambridge, UK, 1994.
Gal, et al., "Bayesian Convolutional Neural Networks With Bernoulli Approximate Variational Inference". arXiv: 1506.02158v6, 2016.
Glynn, "Likelihood ratio gradient estimation for stochastic systems". Communications of the ACM, 1990. https://di.acm.org/doi/10.1145/84537.84552.
Gomez-Bombarelli, et al., "Automatic chemical designs using a data-driven continuous representation of molecules", arXiv:1610.02415 Dec. 5, 2017. https://arxiv.org/abs/1610.02415.
Grathwohl, et al., "Backpropagation through the void: Optimizing control variates for black-box gradient etimation". arXiv:1711.00123, Feb. 23, 2018. https://arxiv.org/abs/1711.00123.

(56) References Cited

OTHER PUBLICATIONS

Gregor, et al., "Deep autoregressive networks". arXiv:1310.8499, May 20, 2014. https://arxiv.org/abs/1310.8499.

Gregor, Karol, et al., "Draw: A Recurrent Neural Network For Image Generation", Proceedings of the 32nd International Conference on Machine Leaning, Lille, France, 2015, JMLR: W&CP vol. 37. Copyright 2015, 10 pages.

Gu, et al., "Muprop: Unbiased backpropagation for stochastic neural networks". arXiv:1511.05176, Feb. 25, 2016. https://arxiv.org/abs/1511.05176.

Hees, "Setting up a Linked Data mirror from RDF dumps". Jörn's Blog, Aug. 26, 2015. SciPy Hierarchical Clustering and Dendrogram Tutorial | Jörn's Blog (joernhees.de).

Heess, N., et al., "Actor-Critic Reinforcement Learning with Energy-based Policies". JMLR, 24:43-57, 2012.

Heidrich-Meisner , et al., "Reinforcement Learning in a Nutshell". http://image.diku.dk/igel/paper/RLiaN.pdf.

Hidasi, et al., "Session-based recommendations with recurrent neural networks", ICRL Mar. 29, 2016. https://arxiv.org/abs/1511.06939.

Hinton, "A practical Guide to Training Restricted Bolzmann Machines". Department of Computer Science university of Toronto, Aug. 2, 2010.

Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.

Hinton, Geoffrey E, et al., "Reducing the Dimensionality of Data with Neural Networks", Science, wwwsciencemag.org, vol. 313, Jul. 28, 2006, pp. 504-507.

Humphrys, M., http://computing.dcu.ie/ humphrys/PhD/ch2.html.

Hurley, Barry, et al., "Proteus: A hierarchical Portfolio of Solvers and Transformations", arXiv:1306.5606v2 [cs.AI], Feb. 17, 2014, 17 pages.

Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.

Zheng, et al., "Graph regularized sparse coding for image representation", IEEE transaction on image processing, 20 K5), (Year: 2010) 1327-1336.

Bach et al., "On the Equivalence between Herding and Conditional Gradient Algorithms," Proceedings of the 29th International Conference on Machine Learning, 2012, 8 pages.

Chen et al., "Herding as a Learning System with Edge-of-Chaos Dynamics," arXiv: 1602.030142V2 [stat.ML], Mar. 1, 2016, 48 pages.

Chen et al., "Parametric Herding," Proceedings of the 13th International Conference on Artificial Intelligence and Statistics (AISTATS), 2010, pp. 97-104.

Dumoulin, V. et al., "On the Challenges of Physical Implementations of RBMs," Proceedings of the 28th AAAI Conference on Artificial Intelligence, vol. 2, Jul. 27, 2014, 7 pages.

Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.

Geordie, "Training DBMs with Physical neural nets" In Hack The Multiverse, Jan. 24, 2014, pp. 2-5.

Zhang, Yichuan , et al., "Continuous Relaxations for Discrete Hamiltonian Monte Carlo", School of Informatic, University of Edinburgh, Dept of Engineering, University of Cambridge, United Kingdom, 9 pages.

Grassberger, "Entropy Estimates from Insufficient Samplings," arXiv:physics/0307138v2 [physics.data-an], Jan. 4, 2008, 5 pages.

Jaakkola et al., "Improving the Mean Field Approximation Via the Use of Mixture Distributions," 1998, 11 pages.

Katzgraber et al., "Glassy Chimeras Could Be Blind to Quantum Speedup: Designing Better Benchmarks for Quantum Annealing Machines," Physical Review X(4):021008, 2014. (8 pages).

Li, X., et al., "Collaborative Variational Autoencoder for Recommender Systems," Published in KDD, Halifax, NS, Canada, Aug. 13-17, 2017, pp. 305-314.

Paninski, "Estimation of Entropy and Mutual Information," Neural Computation 15:1191-1253, 2003.

Reed et al., "Training Deep Neural Networks on Noisy Labels with Bootstrapping," arXiv:1412.6596v3 [cs.CV] Apr. 15, 2015, 11 pages.

Rose et al., "First ever DBM trained using a quantum computer", Hack the Multiverse, Programming quantum computers for fun and profit, XP-002743440, Jan. 6, 2014, 8 pages.

Spall, "Multivariate Stochastic Approximation Using a Simultaneous Perturbation Gradient Approximation," IEEE Transactions on Automatic Control 37(3):332-341, 1992.

Strub, F., et al. "Hybrid Collaborative Filtering with Autoencoders," arXiv:1603.00806v3 [cs.IR], Jul. 19, 2016, 10 pages.

Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recomm endation&hl=ko&as_sdt=O&as_vis=I&oi=scholar, 99 pages.

Schwartz-Ziv, et al., "Opening the black box of Deep Neural Networks via Information", arXiv:1703.00810 Apr. 29, 2017. https://arxiv.org/abs/1703.00810.

Sethi, et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.

Shahriari, et al., "Taking the human out of the loop: A review of bayesian optimization", Proceedings of the IEEE 104 Jan. 1, 2016.

Silver , et al., "Mastering the game of Go with deep neural networks and tree search". Nature, 529, 484489, 2016.

Smelyanskiy, et al., "A near-term quantum computing approach for hard computational problems in space exploration" arXiv preprint arXir:1204.2821 (year:2012).

Sonderby, et al., "Ladder Variational Autoencoders", arXiv: 1602.02282v3 [stat.ML] May 27, 2016, 12 pages.

Sprechmann, et al., "Dictionary learning and sparse coding for unsupervised clustering", in 2010 IEEE international conference on acoustics, speech and signal processing (pp. 2042-2045) IEEE (year:2010).

Sutton, "Learning to Predict by the Methods of Temporal Differences", https://webdocs.cs.ualberta.ca/sutton/papers/sutton-88-with-erratum.pdf.

Sutton, R., et al., "Policy gradient methods for reinforcement learning with function approximation". Advances in Neural Information Processing Sytems, 12, pp. 1057-1063, MIT Press, 2000.

Suzuki, et al., "Joint Multimodal Learning With Deep Generative Models", Nov. 7, 2016, arXiv:1611,0189v1 (Year 2016).

Szegedy, et al., "Rethinking the Inception Architecture for Computer Vision", 2016, Proceedings of the IEEE Conference on Computer Vision and Pattern Recognition (CVPR), pp. 2818-2826 (Year: 2016).

Tieleman, T. & Hinton, G., "Using fast weights to improve persistent contrastive divergence", 2009.

Tokui, et al., "Evaluating the variance of likelihood-ratio gradient estimators", Proceedings of the 34th International Conference on Machine Learning, 2017. http://proceedings.mlr.press/v70/tokui17a.html.

Tripathi, et al., "Survey on credit card fraud detection methods", Internation Journal of Emerging Technology and Advanced Engineering Nov. 12, 2012.

Tucker, et al., "Rebar: Low-variance, unbiased gradient estimates for discrete latent variable models". arXiv: 1703.07370, Nov. 6, 2017. https://arxiv.org/abs/1703.07370.

Vahdat, "Toward Robustness against Label Noise in Training Deep Disciminative Neural Networks". arXiv:1706.00038v2, Nov. 3, 2017. https://arxiv.org/abs/1706.00038.

Vahdat, et al., "Dvae++: Discrete variational autoencoders with overlapping transformations", arXiv: 1802.04920 May 25, 2018. https://arxiv.org/abs/1802.04920.

Van Det Maaten, et al., "Hidden unit conditional random Fields". 14th International Conference on Artificial Intelligence and Statistics, 2011.

(56) References Cited

OTHER PUBLICATIONS

Veit, et al., "Learning From Noisy Large-Scale Datasets With Minimal Supervision". arXiv: 1701.01619v2, Apr. 10, 2017. https://arxiv.org/abs/1701.01619.
Wan, L., et al., "Regularization of Neural Networks using DropConnec". ICML 2013.
Wang, et al., "Classification of common human diseases derived from shared genetic and environmental determinants", Nature Genetics Aug. 7, 2017. https://www.nature.com/articles/ng.3931.
Welling, et al., "Bayesian learning via stochastic gradient langevin dynamics", ICML Jun. 28, 2011. https://dl.acm.org/doi/10.5555/3104482.3104568.
Wiebe, Nathan, et al., "Quantum Inspired Training for Boltzmann Machines", arXiv: 1507.02642v1 [cs.LG] Jul. 9, 2015, 18 pages.
Williams, "Simple Statistical Gradient-Following Algorithms for Connectionist Reinforcement Learning," Springer, College of Computer Science, Northeastern University, Boston, MA, 1992, 27 pages, https://link.springer.com/article/10.1007/BF00992696.
Wittek, Peter, "What Can We Expect from Quantum Machine Learning". Yandex 1-32 School of Data Analysis Conference Machine Learning: Prospects and Applications, Oct. 5, 2015. pp. 1-16.
Xiao, et al., "Learning from massive noisy labeled data for image classification". The IEEE Conference on Computer Vision and Pattern Recognition (CVPR) 2015.
Xie, et al., "A Theory of Generative ConvNet". ICML 2016.
Jang, et al., "Categorical reparameterization with Gumbel-Softmax", arXiv:1611.01144 Aug. 5, 2017. https://arxiv.org/abs/1611.01144.
Jiang, et al., "Learning a discriminative dictionary for sparse coding via label consistent K-SVD", In CVPR 2011 (pp. 1697-1704) IEEE. June, Year 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
Kingma, et al., "Adam: A method for stochastic optimization", arXiv: 1412.6980 Jan. 30, 2017. https://arxiv.org/abs/1412.6980.
Kingma, et al., "Auto-encoding variational bayes". arXiv:1312.5258v1, May 1, 2014. https://arxiv.org/abs/1312.6114.
Kingma, Diederik P, et al., "Semi-Supervised Learning with Deep Generative Models", arXiv: 1406.5298v2 [cs.LG], Oct. 31, 2014, 9 pages.
Kingma, Diedrik, et al., "Auto-Encoding Variational Bayes", https://arxiv.org/abs/1312.6114v10, May 1, 2014.
Krause, et al., "The Unreasonable Effectiveness of Noisy Data for Fine-Grained Recognition", 2016, Springer International Publishing AG, Eccv 2016, Part III, LNCS 9907, pp. 301-320 (Year:2016).
Kuzelka, Ondrej , et al., "Fast Estimation of First-Order Clause Coverage through Randomization and Maximum Likelihood", In proceeding of the 25th International Conference on Machine Learning (pp. 504-5112). Association for Computing Machinery (Year:2008).
L.Wan, M. Zieler, et. al., "Regularization of Neural Networks using DropConnect". ICML, 2013.
Le Roux, Nicolas, et al., "Representational Power of Restricted Boltzmann Machines and Deep Belief Networks", Dept. IRO, University of Montreal Canada, Technical Report 1294, Apr. 18, 2007, 14 pages.
Lee, et al., "Efficient sparse coding algorithm", NIPS, 2007, pp. 801-808.
Schulman, et al., "Gradient estimation using stochastic computing graphs". arXiv: 1506.05254, Jan. 5, 2016. https://arxiv.org/abs/1506.05254.
Lee, H., et al., "Sparse deep belief net model for visual area v2". Advances in Neural Information Processing Systems, 20 . MIT Press, 2008.
Li, et al., "R/'enyi Divergence Variational Inference", arXiv:1602.02311 Oct. 28, 2016. https://arxiv.org/abs/1602.02311.
Lin, et al., "Efficient Piecewise Training of Deep Structured Models for Semantic Segmentation". arXiv: 1504.01013v4, 2016.

Lovasz, et al., "A Correction: orthogonal representations and connectivity of graphs", Linear Algebra and it's Applications 313:2000 pp. 101-105.
Lovasz, et al., "Orthogonal Representations and Connectivity of Graphs", Linear Algebra and its applications 114/115; 1989, pp. 439-454.
Maddison, et al., "The concrete distribution: A continuous relaxation of discrete random variables", arXiv:1611.00712 Mar. 5, 2017. https://arxiv.org/abs/1611.00712.
Makhzani, Alireza, et al., "Adversarial Autoencoders", arXiv:1511,05644v2 [cs.LG], May 25, 2016, 16 pages.
Mandt, et al., "A Variational Analysis of Stochastic Gradient Algorithms", arXiv: 1602.02666 Feb. 8, 2016. https://arxiv.org/abs/1602.02666.
Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.
Misra, et al., "Visual classifiers from noisy humancentric labels". In The IEEE Conference on Computer Vision and Pattern Recognition (CVPR), 2016.
Mnih, et al., "Neural variational inference and learning in belief networks". arXiv:1402.0030 Jun. 4, 2016. https://arxiv.org/abs/1402.0030.
Mnih, et al., "Variational inference for Monte Carlo objectives". arXiv: 1602.06725, Jun. 1, 2016. https://arxiv.org/abs/1602.06725.
Mnih, Andriy, et al., "Variational Inference for Mote Carlo Objectives", Proceedings of the 33rd International Conference on Machine Learning, New York, NY USA, 2016, JMLR: W&CP vol. 48, 9 pages.
Molchanov, Dmitry, et al., "Variational Dropout Sparsities Deep Neural Networks", https://arxiv.org/pdf/1701.05369v1.pdf, Jan. 19, 2017.
Muthukrishnan, et al., "Classical and quantum logic gates: an introduction to quantum computing", Quantum information seminar,)Year: 1999) 22 pages.
N. Srivastava, G. Hinton, et al., "Dropout: A Simple Way to Prevent Neural Networks from Overtting". ICML 15 (Jun):19291958, 2014.
Neal, et al., "Mcmc Using Hamiltonian Dynamics", Handbook of Markov Chain Monte Carlo 2011.
Neven, et al., "Training a binary classifier with the quantum adiabatic algorithm", arXiv preprint arXivc:0811.0416, 2008, 11 pages.
Nowozin, Sebastian, et al., "f-GAN: Training Generative Neural Samplers using Variational Divergence Minimization", arXiv: 1606.00709v1 [stat.ML], 17 pages., Jun. 2, 2016.
Olshausen, Bruno A, et al., "Emergence of simple cell receptive field properties by learning a sparse code for natural images", Nature, vol. 381, Jun. 13, 1996, pp. 607-609.
Patrini, et al., Making Neural Networks robust to label noise: a loss correction approach. arXiv: 1609.03683 (2016).
Phua, et al., "A comprehensive survey", arXiv: 1009.6119 Aug. 30, 2010. https://arxiv.org/abs/1009.6119.
Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1 Caf5b3757ed0e8f404eabb31546d5698a.
Rasmus, Antti, et al., "Semi-Supervised Learning with Ladder Networks", arXiv: 1507.02672v2 [cs.NE] Nov. 24, 2015, 19 pages.
Rezende, et al., "Stochastic Backpropagation and Approximate Inference in Deep Generative Models," arXiv: 1401.4082v3 [stat.ML] May 30, 2014, 14 pages, https://arxiv.org/abs/1401.4082.
Rezende, Danilo J, et al., "Variational Inference with Normalizing Flows", Proceedings of the 32nd International Conference on Machine Learning, Lille, France 2015, JMLR: W&CP vol. 37, 9 pages.
Rolfe, "Discrete variational autoencoders" arXiv: 1609.02200 Apr. 22, 2017. https://arxiv.org/abs/1609.02200.
Rose, et al., "Training DBMs with Physical Neural Nets," Hack The Multiverse, Jan. 24, 2014, pp. 2-5. Retrieved from the Internet: URL: https://dwave.wordpress.com/2014/01/24/trainingdbmswith-physical-neural-nets, see pp. 2-5.
Salakhutdinov, R., "Learning deep Boltzmann machines using adaptive MCMC", 2010.

(56) References Cited

OTHER PUBLICATIONS

Salakhutdinov, R., "Learning in Markov random transitions.elds using tempered", 2009.
Salakhutdinov, R. & Murray, I., "On the quantitative analysis of deep belief networks", 2008.
Saliman, Tim, "A Structured Variational Auto-encoder for Learning Deep Hierarchies of Sparse Features", arXiv:1602.08734v1 [stat.ML] Feb. 28, 2016, 3 pages.
Salimans, Tim, et al., "Markov Chain Monte Carlo and Variational Inference: Bridging the Gap", arXiv:1410.6460v4 [stat.CO] May 19, 2015, 9 pages.
Achille et Soatto, "Information Dropout: Learning Optimal Representations Through Noise" Nov. 4, 2016, ICLR, arXiv:1611.01353v1, pp. 1-12. (Year: 2016).
Awasthi et al., "Efficient Learning of Linear Seperators under Bounded Noise" Mar. 12, 2015, arXiv: 1503.035S4v1, pp. 1-23. (Year: 2015).
Awasthi et al., "Learning and 1-bit Compressed Sensing under Asymmetric Noise" Jun. 6, 2016, JMLR, pp. 1-41. (Year 2016).
Benedetti et al., "Quantum-assisted learning of graphical models with arbitrary pairwise connectivity" Sep. 8, 2016, arXiv:1609.02542v1, pp. 1-13. (Year: 2016).
Blanchard et al., "Classification with Asymmetric Label Noise: Consistency and Maximal Denoising" Aug. 5, 2016, arXiv: 1303.1208v3, pp. 1-47. (Year: 2016).
Bornschein et al., "Bidirectional Helmholtz Machines" May 25, 2016, arXiv: 1506.03877v5. (Year: 2016).
Jain et al., "Estimating the class prior and posterior from noisy positives and unlabeled data" Jun. 28, 2016, arXiv: 1606.08561v1, pp. 1-19. (Year: 2016).
Ke et al., "Variational Convolutional Networks for Human-Centric Annotations" Nov. 20, 2016, pp. 120-135. (Year: 2016).
Korenkevych et al., "Benchmarking Quantum Hardware for Training of Fully Visible Boltzmann Machines" Nov. 14, 2016, arXiv: 611,04528v1, pp. 1-22. (Year: 2016).
Liu et Tao, "Classification with Noisy Labels by Importance Reweighting" Mar. 2016, pp. 447-461. (Year: 2016).
Menon et al., "Learning from Binary Labels with Instance-Dependent Corruption" May 4, 2016, pp. 1-41. (Year: 2016).
Non-Final Office Action Issued in U.S. Appl. No. 15/822,884 dated Feb. 17, 2022, 45 pages.
Non-Final Office Action Issued in U.S. Appl. No. 16/336,625 dated Feb. 14, 2022, 22 pages.
Omidshafiei et al., "Hierarchical Bayesian Noise inference for Robust Real-time Probabilistic Object Classification" Jul. 14, 2016, arXiv: 1605.01042v2, pp. 1-9. (Year: 2016).
Ororbia et al., "Online Semi-Supervised Learning with Deep Hybrid Boltzmann Machines and Denoising Autoencoders" Jan. 18, 2016, ICLR, arXiv: 1511.06964V7, pp. 1-17. (Year: 2016).
Serban et al., "Multi-Modal Variational Encoder-Decoders" Dec. 1, 2016, arXiv: 1612.00377v1, pp. 1-18. (Year: 2016).
Shah et al., "Feeling the Bern: Adaptive Estimators for Bernoulli Probabilities of Pairwise Comparisons" Mar. 22, 2016, pp. 1-33. Year: 2016).
Tosh, Christopher, "Mixing Rates for the Alternating Gibbs Sampler over Restricted Boltzmann Machines and Friends" Jun. 2016. Year: 2016).
Wang et al., "Paired Restricted Boltzmann Machine for Linked Data" Oct. 2016. (Year: 2016).
Xu et Ou "Joint Stochastic Approximation Learning of Helmholtz Machines" Mar. 20, 2016, ICLR arXiv: 1603.06170v1, pp. 1-8. (Year: 2016).

SYSTEMS AND METHODS FOR QUANTUM BAYESIAN NETWORKS

FIELD

This disclosure generally relates to analog computing, and in particular to quantum machine learning.

BACKGROUND

Machine learning models are often represented by graphical models, such as probabilistic graphical models which reflect probabilistic structures of model variables. Probabilistic graphical models typically comprise either directed or undirected graphs.

Directed graphs can represent causal relationships explicitly via directed edges, which allows for relatively compact representations of probability distributions. A special case of the directed graph is the Bayesian network (also known as a directed acyclic graph). Bayesian networks allow for straightforward determination of conditional probabilities based only on parent nodes.

Undirected graphs do not provide explicit dependencies via directed edges. Undirected graphs thus typically are relatively less compact, require more variables, are more challenging to train and infer, and are more powerful relative to directed graphs. A special case of the undirected graph is the Markov network. Both training and inference of Markov networks typically involve making determinations based on a partition function characterizing the network, which is typically NP-hard.

Analog processors provide a number of analog computation devices with physical characteristics (often continuously-varying) which can be exploited for computational purposes without necessarily being limited to the execution of binary logical circuits. At least some analog processors provide a plurality of analog computation devices which are controllably coupled to each other by couplers. Such analog processors may be themselves correspond in structure to certain types of graphs (e.g. where computation devices correspond to nodes and couplers correspond to edges) and may thus be naturally adapted to representing graphs of the same or similar types.

Analog processors may take many forms. Where analog processors exhibit computationally-relevant quantum mechanical effects (e.g. entanglement, tunneling, or the like), they may be referred to as quantum processors and their computation devices are called qubits. Quantum processors may have a number of qubits, couplers, and associated local bias devices, exemplary embodiments of which are described in, for example, U.S. Pat. Nos. 7,533,068, 8,008,942, 8,195,596, 8,190,548, and 8,421,053. Such quantum processors may operate, for example, via quantum annealing and/or may operate adiabatically. For the sake of convenience, the following disclosure refers generally to "qubits" and "quantum processors", although those skilled in the art will appreciate that this disclosure may be implemented in systems comprising other analog processors.

Some quantum processors, such as exemplary quantum annealing processors described above, provide mutual, symmetric coupling between qubits. Such quantum processors have, for example, been modelled as undirected graphs and used to represent undirected graphs (see, for example, US Patent Publication 2017/0300817). Such techniques have been used to represent, for example, Markov networks (e.g. restricted Boltzmann machines).

There has been some exploration of processing Bayesian networks by certain types of quantum computers, such as gate model quantum computers, where gate operations allow asymmetry in couplings (see, e.g., Tucci, *Use of a Quantum Computer to do Importance and Metropolis-Hastings Sampling of a Classical Bayesian Network*, arXiv:0811.1792 [quant-ph] and Sakkaris, *QuDot Nets: Quantum Computers and Bayesian Networks*, arXiv:1607.07887 [quant-ph]). Such techniques are not directly applicable to certain quantum computers, such as quantum computers with topologies which correspond to undirected graphs.

There is thus a general desire for systems and methods for providing directed graphical models in quantum computers with topologies corresponding to undirected graphs.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

Computational systems and methods are described which, at least in some implementations, allow for the computation of at least some problems by certain quantum processors where the problems are represented as directed graphical models and the quantum processor provides a hardware topology and coupling physics which correspond to an undirected graphical representation.

Aspects of the present disclosure provide systems and methods for quantum computing given a problem represented by a Bayesian network. The system comprises circuitry including at least one processor. The at least one processor is in communication with a quantum processor comprising a plurality of qubits and couplers. The couplers are operable to symmetrically couple qubits. The system executes the method.

The method comprises obtaining a representation of the problem, the representation of the problem comprising a Bayesian network having a first plurality of nodes and a first plurality of directed edges; transforming the Bayesian network to a Markov network having a second plurality of nodes and a second plurality of undirected edges; transmitting the Markov network to the quantum processor and, by said transmitting, causing the quantum processor to execute based on the Markov network; obtaining one or more samples from the quantum processor; determining one or more parameters of the Markov network based on the one or more samples to generate a parametrized Markov network; and determining an approximation of a prediction for the problem based on the parametrized Markov network.

In some implementations, transforming the Bayesian network to the Markov network comprises moralization of the Bayesian network. Moralization comprises marrying parent nodes of the first plurality of nodes and removing directionality from the first plurality of edges.

In some implementations, transforming the Bayesian network to the Markov network comprises forming the Markov network based on a subgraph of a graph induced by the quantum processor's qubits and couplers. In some implementations, forming the Markov network comprises forming a Boltzmann machine. In some implementations, forming a Boltzmann machine comprises forming a Chimera-structured restricted Boltzmann machine corresponding to a Chimera-structured topology of the quantum processor.

In some implementations, transforming the Bayesian network to the Markov network comprises generating the Markov network based on a topology of the quantum processor and based on a size of the Bayesian network. In some implementations, determining one or more parameters of the Markov network comprises optimizing an objective function of the Bayesian network based on a joint probability distribution corresponding to the Bayesian network. In some implementations, determining one or more parameters of the Markov network comprises performing a positive phase of training based on a classically-tractable feature vector of the Bayesian network and performing a negative phase of training based on the one or more samples from the quantum processor. In some implementations, the Markov network comprises a Boltzmann machine.

In some implementations, causing the quantum processor to execute comprises causing the quantum processor to physically bias the plurality of qubits and plurality of couplers to correspond to the nodes and edges of the Markov network, and evolve a state of the quantum processor to generate the one or more samples.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

The present disclosure provides systems and methods for computing problems represented as directed graphical models with quantum processors with topologies and coupling physics which correspond to undirected graphs. In particular, at least some implementations of the presently-disclosed systems and methods provide techniques for generating approximations of Bayesian networks via a quantum processor capable of computing problems based on a Markov network-representation of such problems.

Introductory Generalities

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Computing Systems

Figure 1:
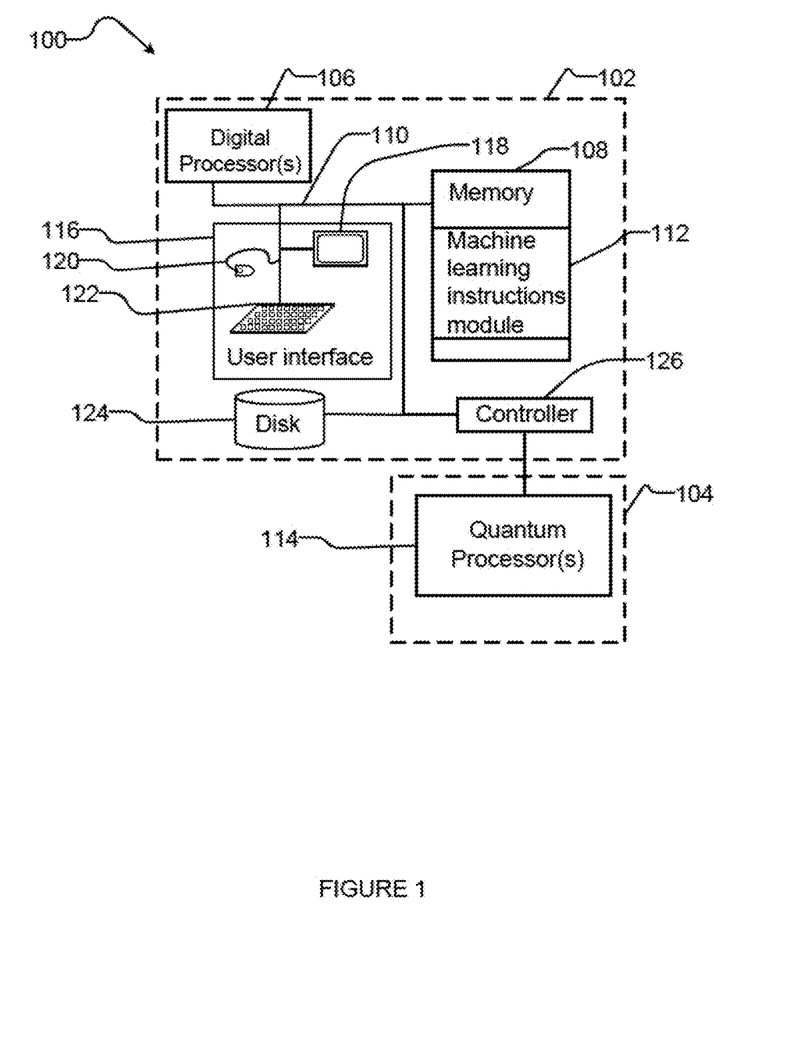
FIG. 1 is a schematic diagram of an exemplary hybrid computer including a digital computer and an analog computer in accordance with the present systems, devices, methods, and articles.

FIG. 1 illustrates a computing system 100 comprising a digital computer 102. The example digital computer 102 includes one or more digital processors 106 that may be used to perform classical digital processing tasks. Digital computer 102 may further include at least one system memory 108, and at least one system bus 110 that couples various system components, including system memory 108 to digital processor(s) 106. System memory 108 may store a VAE instructions module 112.

The digital processor(s) 106 may be any logic processing unit or circuitry (e.g., integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 114. Digital computer 102 may communicate with analog computer 104 via, for instance, a controller 126. Certain computations may be performed by analog computer 104 at the instruction of digital computer 102, as described in greater detail herein.

Digital computer 102 may include a user input/output subsystem 116. In some implementations, the user input/output subsystem includes one or more user input/output components such as a display 118, mouse 120, and/or keyboard 122.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 124. Non-volatile memory 124 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a rigid spinning magnetic disk or a magnetic floppy disk or diskette. Non-volatile memory 124 may communicate with digital processor(s) via system bus 110 and may include appropriate interfaces or controllers 126 coupled to system bus 110. Non-volatile memory 124 may serve as long-term storage for processor- or computer-readable instructions, data structures, or other data (sometimes called program modules) for digital computer 102.

Although digital computer 102 has been described as employing hard disks, optical disks and/or solid state storage media, those skilled in the relevant art will appreciate that other types of nontransitory and non-volatile computer-readable media may be employed, such magnetic cassettes, flash memory cards, Flash, ROMs, smart cards, etc. Those skilled in the relevant art will appreciate that some computer architectures employ nontransitory volatile memory and nontransitory non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104. Also for example, system memory 108 may store at least one of processor executable instructions or data that, when executed by at least one processor, causes the at least one processor to execute the various algorithms described elsewhere herein, including machine learning related algorithms. For instance, system memory 108 may store a machine learning instructions module 112 that includes processor- or computer-readable instructions to provide a machine learning model, such as a variational autoencoder. Such provision may comprise training and/or performing inference with the machine learning model, e.g., as described in greater detail herein.

In some implementations system memory 108 may store processor- or computer-readable calculation instructions and/or data to perform pre-processing, co-processing, and post-processing to analog computer 104. System memory 108 may store a set of analog computer interface instructions to interact with analog computer 104. When executed, the stored instructions and/or data cause the system to operate as a special purpose machine.

Analog computer 104 may include at least one analog processor such as quantum processor 114. Analog computer 104 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cryogenically cool the analog processor, for example to temperature below approximately 1° Kelvin.

Bayesian Networks for Markovian Topologies

It may not be practicable to represent a Bayesian network $\mathcal{B}$ defined on some space x in the physical topology of a particular quantum processor. If the quantum processor is capable of representing and computing Markov networks, we can approximate the probability distribution $p_\mathcal{B}$ (x) corresponding to $\mathcal{B}$ by another distribution $q_\mathcal{M}$ (x) corresponding to a Markov network $\mathcal{M}$ also defined on x. The quantum processor may then draw samples from (or otherwise compute) the approximating Markov network, the results of which may be reconstituted into an approximate solution to the Bayesian network $\mathcal{B}$.

The Bayesian network $\mathcal{B}$ can be factorized as the following joint probability distribution:

$$p(x_1, x_2, \ldots, x_N) = \prod_i^N p(x_i \mid p_a(x_i))$$

where $x=(x_1, x_2, \ldots, x_N)$ are the N nodes of the Bayesian network and $pa(x_i)$ is the set of all parental nodes of $x_i$. Further, a Markov network $\mathcal{M}$ may be described by the following joint distribution:

$$q(x_1, x_2, \ldots, x_N) = \prod_{C \in Cli(G)} \phi_C(x_C)$$

where Cli(G) is the set of cliques in an undirected graph G of the Markov network and $\phi_C$ is the potential function defined on clique C. The challenge is to migrate the probability distribution p of the Bayesian network $\mathcal{B}$ to a probability function q of a Markov network, at least approximately, computing q by the quantum processor, and translating the result of the computation back to Bayesian network $\mathcal{B}$.

Figure 2:
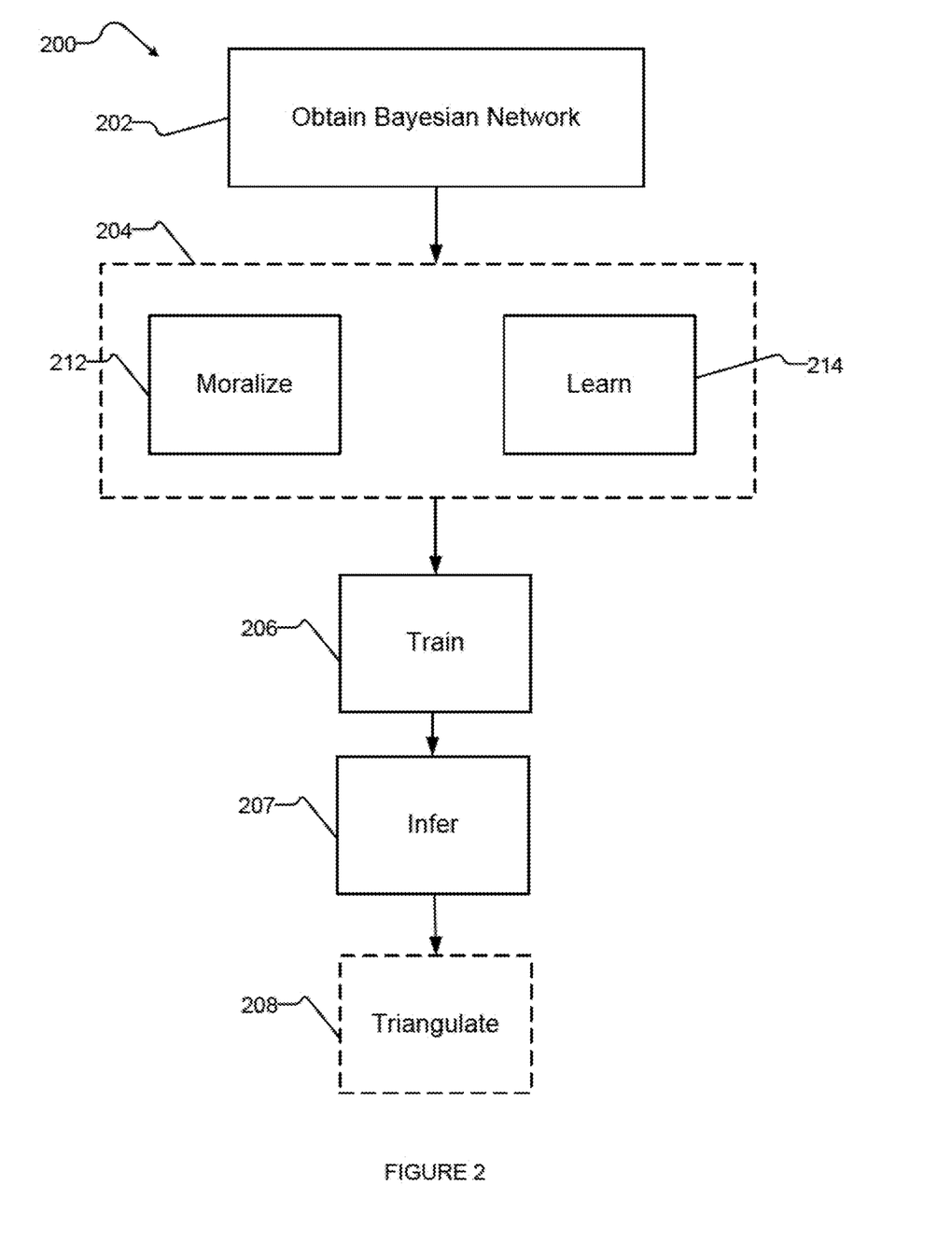
FIG. 2 is a flowchart of an exemplary method for computing problems represented by Bayesian networks by a quantum computer.

FIG. 2 shows an example method 200 for computing problems represented by Bayesian networks via a quantum processor. The method is performed by a classical computer (e.g. one or more processors) which may be in communication with a quantum processor.

At 202 a classical processor obtains a Bayesian network representing a problem. It may be obtained from a user, from storage, generated from inputs or other data, and/or otherwise obtained. At 204 the classical processor transforms the Bayesian network to a Markov network. In some implementations, the classical processor transforms the Bayesian network to a Markov network via moralization (e.g. at 212), which involves marrying all of the parent nodes and then dropping all of the directionalities of the edges. For example, the processor may replace each conditional probability $p(x_i|pa(x_i))$ with a joint distribution $p(x_i,pa(x_i))$ defined on the clique $x_i \cup pa(x_i)$. This conversion is not lossless, as it can remove the conditional independencies between nodes, so the results will be approximations. Extraneous edges will tend to introduce additional error, so it can be desirable for $\mathcal{M}$ to have a minimal number of edges, although this is not strictly required.

In some implementations, the Markov network has a structure corresponding to the topology of the quantum processor. For example, given a quantum processor with a Chimera topology and symmetric coupling, the Markov network $\mathcal{M}$ may comprise a Chimera-structured (restricted) Boltzmann machine. The probability function of $\mathcal{M}$ may be, for example:

$$q(x) = \frac{\exp(-\theta^T \phi(x))}{Z(\theta)}$$

where $\theta$ is a parameter vector of qubit bias values (typically denoted h) and coupler bias values (typically denoted J), $\phi(x)$ is the feature vector defined over cliques, and $Z(\theta)$ is the partition function (sometimes called the normalization).

In some implementations, the classical processor moralizes the Bayesian network $\mathcal{B}$ to a Chimera-structured Markov network $\mathcal{M}$, thereby represents a Bayesian network with probability distribution p as a Markov network. For example, given the example Bayesian network 302 of FIG. 3, $\mathcal{M}$ may correspond to Markov network 304 and have a joint probability distribution described by $$q(x) = \frac{1}{Z(x)} \exp(-\psi_1(x_1, x_2, x_3) - \psi_2(x_2, x_3, x_4)).$$

Figure 3:
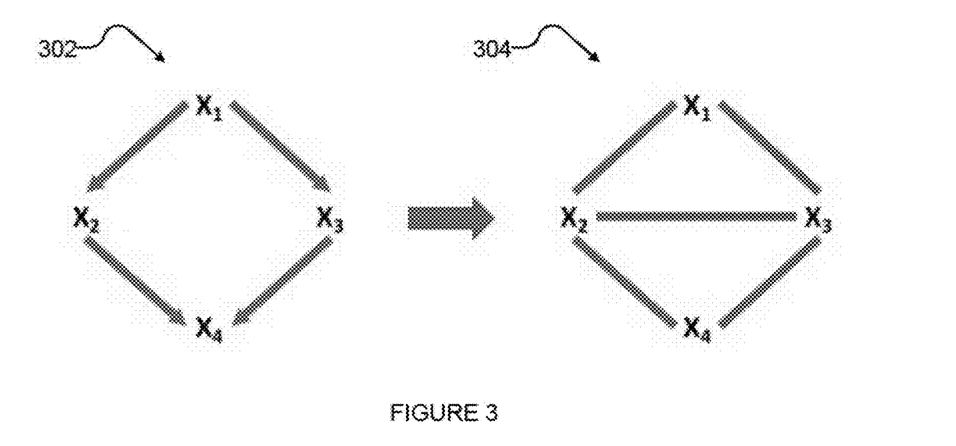
FIG. 3 is a schematic diagram of an example Bayesian network and a transformation of the Bayesian network into an approximately-corresponding Markov network.

If the normalization is $Z(x)=1$ (which may, in at least some circumstances, be assumed for convenience), then the two feature functions $\psi_i$ can be described by:

$\psi_1(x_1,x_2,x_3) = \ln [p(x_1)p(x_2|x_1)p(x_3|x_1)]$ $\psi_2(x_2,x_3,x_4) = \ln [p(x_4|x_2,x_3)].$ These two exemplary feature functions may be described as quadratic unconstrained binary optimization (QUBO) equations, such as the following:

$$\psi_1(x_1, x_2, x_3; \theta_1) = \sum_{i \in \{1,2,3\}} h_i x_i + \sum_{ij \in \{12,13,23\}} J_{ij} x_i x_j + a$$

$$\psi_2(x_2, x_3, x_4; \theta_2) = \sum_{i \in \{2,3,4\}} h_i x_i + \sum_{ij \in \{23,24,34\}} J_{ij} x_i x_j + b$$

where $\theta_1 = [h_1, h_2, h_3, J_{12}, J_{13}, J_{23}]^T$, $\theta_2 = [h_2, h_3, h_4, J_{23}, J_{24}, J_{34}]^T$, and a and b are constants.

In some implementations, the classical processor transforms the Bayesian network to a Markov network by learning the probability distribution of the Bayesian network with a Markov network (e.g. at 214). For example, the classical processor may learn the Bayesian network via a Boltzmann machine (a type of Markov network). Boltzmann machines include restricted Boltzmann machines, which possess a degree of correspondence to the Chimera structure mentioned above.

In such implementations, the classical processor generates the structure of a Boltzmann machine based on the Bayesian network. For example, the processor may generate the Boltzmann machine by defining visible units of the Boltzmann machine on all of the nodes of the Bayesian network, e.g. by defining the Markov probability function q as:

$$q(x) = \frac{\sum_h E(x, h)}{Z}$$

where Z is the partition function.

The resulting Boltzmann machine is based on an undirected graph and does not necessarily require pre-training knowledge of the graphical structure of $\mathcal{B}$ (i.e. it does not require express deconstruction of the feature functions as described in the above example). The generalizability of this technique is potentially advantageous in suitable circumstances, but of course the resulting (restricted) Boltzmann machine will tend to be less compact and have more variables (namely hidden variables) than the original Bayesian network $\mathcal{B}$, and potentially more than Markov networks trained as described above, and so it may be more computationally costly to train and infer with networks generated in this way.

Note that although acts 212 and 214 are depicted separately within act 204, act 204 may comprise doing one or both of acts 212 and 214.

At 206, the classical processor determines the parameters of the Markov network generated at 204. Where a system of equations is known (e.g. as in the above example), the parameters may be determined according to conventional linear algebraic techniques. However, note that the system may be overdetermined. This is the case with the foregoing example, which has 11 parameters and 16 equations between $\psi_1$ and $\psi_2$. Accordingly, an exact solution may not exist. An approximating solution may instead be generated, for example by determining the least-squares solution to the system $A\theta = -\ln p(x)$ where A is the coefficients of the QUBOs. (This involves determining the pseudo-inverse of A, $A^+$ and determining the approximate solution $\hat{\theta} = A^+[-\ln p(x)]$).

However, where the Markov network is based on the quantum processor's topological structure (by moralization and/or by learning), the quantum processor (and/or a classical proxy thereof) may be used. For example, if the quantum processor is Chimera-structured, then the Markov network may also be Chimera-structured (and/or a subgraph thereof). The Markov network may then be trained by optimizing an objective function, such as the Kullback-Liebler divergence between p(x) and q(x), i.e. KL[p(x)|q(x)]. The positive phase may be computed classically since the expected value for $\phi(x)$ under p(x) is tractable for a Bayesian network. The negative phase is intractable, but may be approximated by sampling from the Markov network via the quantum processor (or by suitable classical techniques such as Markov Chain Monte Carlo).

Sampling from the quantum processor may comprise instructing a quantum processor to represent the Markov network by physically biasing the quantum processor's qubits and couplers to correspond to the nodes and edges of the Markov network, evolving the represented system to generate one or more samples, and returning the resulting samples. The classical processor may then use the samples to optimize an objective function.

At 207, the parametrized Markov network $\mathcal{M}$ is used to perform inference in the place of (or in addition to) the original Bayesian network $\mathcal{B}$. Optionally, at 208, a Bayesian network may be reconstituted from the output of the parametrized Markov network. This may be done by, for example, obtaining a graphical structure for the Bayesian network—either by using the original graphical structure or assembling a (potentially) new one by converting the Markov network to a junction tree by performing triangulation, finding the maximal cliques, and converting the junction tree to a Bayesian network by adding directed edges from parents of nodes to nodes based on the order of nodes and cliques.

Once a graphical structure is obtained, the conditional probabilities of the Markov network may be migrated to the Bayesian network by learning the parameters of the Bayesian network from the output of the Markov network. Training may proceed by, for example, maximum likelihood estimation and/or by Bayesian estimation (in both cases, based on the output data).

Concluding Generalities

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to:

U.S. Pat. No. 7,533,068
U.S. Pat. No. 8,008,942
U.S. Pat. No. 8,195,596
U.S. Pat. No. 8,190,548
U.S. Pat. No. 8,421,053
US Patent Publication 2017/0300817

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for quantum computing given a problem represented by a Bayesian network, the method executed by circuitry including at least one processor, the at least one processor in communication with a quantum processor comprising a plurality of qubits and couplers, the couplers operable to symmetrically couple qubits, the method comprising:
   obtaining a representation of the problem, the representation of the problem comprising a Bayesian network having a first plurality of nodes and a first plurality of directed edges;
   transforming the Bayesian network to a Markov network having a second plurality of nodes and a second plurality of undirected edges;
   transmitting the Markov network to the quantum processor and, by said transmitting, causing the quantum processor to execute based on the Markov network;
   obtaining one or more samples from the quantum processor; and
   determining one or more parameters of the Markov network based on the one or more samples to generate a parametrized Markov network; and
   determining an approximation of a predicted solution for the problem based on the parametrized Markov network.

2. The method according to claim 1 wherein transforming the Bayesian network to the Markov network comprises performing moralization of the Bayesian network, moralization comprising marrying parent nodes of the first plurality of nodes and removing directionality from the first plurality of edges.

3. The method according to claim 1 wherein transforming the Bayesian network to the Markov network comprises forming the Markov network based on a subgraph of a graph induced by the quantum processor's qubits and couplers.

4. The method according to claim 3 wherein forming the Markov network comprises forming a Boltzmann machine.

5. The method according to claim 4 wherein forming a Boltzmann machine comprises forming a Chimera-structured restricted Boltzmann machine corresponding to a Chimera-structured topology of the quantum processor.

6. The method according to claim 1 wherein transforming the Bayesian network to the Markov network comprises generating the Markov network based on a topology of the quantum processor and based on a size of the Bayesian network.

7. The method according to claim 6 wherein determining one or more parameters of the Markov network comprises optimizing an objective function of the Bayesian network based on a joint probability distribution corresponding to the Bayesian network.

8. The method according to claim 7 wherein determining one or more parameters of the Markov network comprises performing a positive phase of training based on a classically-tractable feature vector of the Bayesian network and performing a negative phase of training based on the one or more samples from the quantum processor.

9. The method according to claim 8 wherein the Markov network comprises a Boltzmann machine.

10. The method according to claim 1 wherein causing the quantum processor to execute comprises causing the quantum processor to physically bias the plurality of qubits and plurality of couplers to correspond to the nodes and edges of the Markov network, and evolve a state of the quantum processor to generate the one or more samples.

11. A hybrid computational system, comprising:
   a quantum processor comprising a plurality of qubits and couplers, the couplers operable to symmetrically couple qubits;
   at least one processor in communication with the quantum processor; and at least one nontransitory processor-readable storage medium that stores at least one of processor-executable instructions or data which, when executed by the at least one processor cause the at least one processor to execute a method having the following acts:

obtaining a representation of the problem, the representation of the problem comprising a Bayesian network having a first plurality of nodes and a first plurality of directed edges;

transforming the Bayesian network to a Markov network having a second plurality of nodes and a second plurality of undirected edges;

transmitting the Markov network to the quantum processor and, by said transmitting, causing the quantum processor to execute based on the Markov network;

obtaining one or more samples from the quantum processor; and determining one or more parameters of the Markov network based on the one or more samples to generate a parametrized Markov network; and determining an approximation of a predicted solution for the problem based on the parametrized Markov network.

12. The hybrid computing system according to claim 11 wherein transforming the Bayesian network to the Markov network comprises performing moralization of the Bayesian network, moralization comprising marrying parent nodes of the first plurality of nodes and removing directionality from the first plurality of edges.

13. The hybrid computing system according to claim 11 wherein transforming the Bayesian network to the Markov network comprises forming the Markov network based on a subgraph of a graph induced by the quantum processor's qubits and couplers.

14. The hybrid computing system according to claim 13 wherein forming the Markov network comprises forming a Boltzmann machine.

15. The hybrid computing system according to claim 14 wherein forming a Boltzmann machine comprises forming a Chimera-structured restricted Boltzmann machine corresponding to a Chimera-structured topology of the quantum processor.

16. The hybrid computing system according to claim 11 wherein transforming the Bayesian network to the Markov network comprises generating the Markov network based on a topology of the quantum processor and based on a size of the Bayesian network.

17. The hybrid computing system according to claim 16 wherein determining one or more parameters of the Markov network comprises optimizing an objective function of the Bayesian network based on a joint probability distribution corresponding to the Bayesian network.

18. The hybrid computing system according to claim 17 wherein determining one or more parameters of the Markov network comprises performing a positive phase of training based on a classically-tractable feature vector of the Bayesian network and performing a negative phase of training based on the one or more samples from the quantum processor.

19. The hybrid computing system according to claim 18 wherein the Markov network comprises a Boltzmann machine.

20. The hybrid computing system according to claim 11 wherein causing the quantum processor to execute comprises causing the quantum processor to physically bias the plurality of qubits and plurality of couplers to correspond to the nodes and edges of the Markov network, and evolve a state of the quantum processor to generate the one or more samples.

21. A computational system, comprising:
at least one processor in communication with a quantum processor; and
at least one nontransitory processor-readable storage medium that stores at least one of processor-executable instructions or data which, when executed by the at least one processor cause the at least one processor to execute a method having the following acts:

obtaining a representation of the problem, the representation of the problem comprising a Bayesian network having a first plurality of nodes and a first plurality of directed edges;

transforming the Bayesian network to a Markov network having a second plurality of nodes and a second plurality of undirected edges;

transmitting the Markov network to the quantum processor and, by said transmitting, causing the quantum processor to execute based on the Markov network;

obtaining one or more samples from the quantum processor; and determining one or more parameters of the Markov network based on the one or more samples to generate a parametrized Markov network; and determining an approximation of a predicted solution for the problem based on the parametrized Markov network.

* * * * *

UNITED STATES PATENT AND TRADEMARK OFFICE
CERTIFICATE OF CORRECTION

PATENT NO. : 11,386,346 B2
APPLICATION NO. : 16/357773
DATED : July 12, 2022
INVENTOR(S) : Yanbo Xue et al.

It is certified that error appears in the above-identified patent and that said Letters Patent is hereby corrected as shown below:

In the Specification

Column 7, Line 31:
"$\alpha_2(x_2,x_3,x_4) = \ln[p(x_4|x_2,x_3)]$" should read,
-- $\psi_2(x_2,x_3,x_4) = \ln[p(x_4|x_2,x_3)]$ --.

Signed and Sealed this
Eleventh Day of October, 2022

Katherine Kelly Vidal
*Director of the United States Patent and Trademark Office*